United States Patent
Kotlar et al.

(10) Patent No.: US 7,244,693 B2
(45) Date of Patent: Jul. 17, 2007

(54) WELL TREATMENT

(75) Inventors: Hans Kristian Kotlar, Stavanger (NO); Olav Martin Selle, Stavanger (NO); Oddvar Arnfinn Aune, Stavanger (NO); Lars Kilaas, Stavanger (NO); Anne Dalager Dyrli, Stavanger (NO)

(73) Assignee: Statoil ASA, Stravanger (NO)

( * ) Notice: Subject to any disclaimer, the term of this patent is extended or adjusted under 35 U.S.C. 154(b) by 362 days.

(21) Appl. No.: 10/432,189

(22) PCT Filed: Nov. 19, 2001

(86) PCT No.: PCT/GB01/05087

§ 371 (c)(1),
(2), (4) Date: Oct. 27, 2003

(87) PCT Pub. No.: WO02/40827

PCT Pub. Date: May 23, 2002

(65) Prior Publication Data

US 2004/0060702 A1 Apr. 1, 2004

(30) Foreign Application Priority Data

Nov. 20, 2000 (GB) ................................. 0028264.0

(51) Int. Cl.
*C09K 8/536* (2006.01)
(52) U.S. Cl. ....................... 507/219; 507/902; 507/939
(58) Field of Classification Search ................ 507/902, 507/219, 221, 939
See application file for complete search history.

(56) References Cited

U.S. PATENT DOCUMENTS

| 4,530,956 A | * | 7/1985 | Ugelstad et al. ............ 524/458 |
| 4,923,645 A | | 5/1990 | Tsang et al. |
| 5,437,331 A | | 8/1995 | Gupta et al. |
| 6,239,224 B1 | | 5/2001 | Mørk et al. |

FOREIGN PATENT DOCUMENTS

| EP | 0 003 905 | 10/1996 |
| NO | 310039 | 5/1995 |
| WO | WO 01 94744 | 12/2001 |

* cited by examiner

*Primary Examiner*—Philip C. Tucker
(74) *Attorney, Agent, or Firm*—Sughrue Mion, PLLC

(57) ABSTRACT

A method for the treatment of a hydrocarbon well comprising administering down the well polymeric particles impregnated with a well treatment chemical or precursor or generator thereof. The particles have a pore volume of at least 20%, and are prepared by a process which comprises preparing an aqueous dispersion of polymer particles containing from 0.05 to 10 times by volume, based on the polymer, of one or more specific first material(s) adding a partly water-soluble second material having a water-solubility of at least ten times that of first material(s) under conditions which prevent or hinder transport of first material(s) through the aqueous phase, whereby second material diffuses into the polymer particles swelled with first material(s) and increases the volume of said particles by from 20 to 1000 times, based on the polymer.

10 Claims, No Drawings

WELL TREATMENT

CROSS-REFERENCE TO RELATED APPLICATION

This application is a 371 of PCT/GB01/05087, filed Nov. 19, 2001, the disclosure of which is incorporated herein by reference.

This invention relates to a method of treating a hydrocarbon well with well treatment chemicals, in particular by down-hole placement of polymeric particles carrying well treatment chemicals or precursors or generators thereof, and to such particles and compositions and structures containing them.

During the operation of a hydrocarbon well (i.e. a gas or oil well) various down-hole problems arise such as corrosion of metal fittings, hydrocarbon flow-inhibiting deposition (e.g. of scale, gas clathrates, metal sulphides, waxes, gel polymers, microbial debris, etc.), generation of toxic hydrogen sulphide by sulphate-reducing bacteria, increased water flow into the producer bore, etc.

Thus, for example, where sea water is injected through an injection bore hole into an oil-bearing stratum to drive oil through the formation (i.e. the rock) into the producer well hole, differences in solutes in the injection water and the water already present in the formation can cause metal salts to precipitate as scale so causing gradually increasing clogging of the producer well hole.

Typically this is dealt with by applying a "squeeze" of scale inhibitor chemicals, i.e. chemicals which break down the scale and increase oil or gas flow. This generally involves ceasing hydrocarbon flow, forcing an aqueous solution of the scale inhibitor down the producer bore under pressure to drive the inhibitor solution into the formation, and restarting production. Such treatment generally allows a further six or so months of hydrocarbon flow before a further squeeze is required and each squeeze causes some damage to the formation surrounding the producer bore hole and as a result an increased flow of formation fragments (i.e. rock grains etc.) into the bore.

The producer bore hole in an oil well is generally lined in the hydrocarbon bearing stratum with "gravel packs", sand containing filter elements, which serve to trap formation fragments and it has been proposed to include in such gravel packs ceramic particles coated with or impregnated with well treatment chemicals such as scale inhibitors (see EP-A-656459 and WO 96/27070) or bacteria (see WO 99/36667). Likewise treatment of the formation surrounding the producer well bore hole with well treatment chemicals before hydrocarbon production begins has also been proposed, e.g. in GB-A-2290096 and WO 99/54592.

Various polymeric, oligomeric, inorganic and other particulate carriers for well treatment chemicals are also known, e.g. ion exchange resin particles (see U.S. Pat. No. 4,787,455), acrylamide polymer particles (see EP-A193369), gelatin capsules (see U.S. Pat. No. 3,676,363), oligomeric matrices and capsules (see U.S. Pat. No. 4,986,353 and U.S. Pat. No. 4,986,354), ceramic particles (see WO 99/54592, WO 96/27070 and EP-A-656459), and particles of the well treatment chemical itself (see WO 97/45625).

There is still a need for means of well treatment which give a prolonged period of protection, e.g. against scale or other problems, such as corrosion or hydrocarbon flow restricting problems.

We have now found that polymeric particles produced by the swell-polymerization technique developed by the late Professor John Ugelstad are especially suitable as carriers for well treatment chemicals and their precursors in view of their high porosity and substantial monodispersity. Such particles may be produced as described in EP-B-3905, U.S. Pat. No. 4,530,956 and WO 99/19375 the contents of which are hereby incorporated by reference and are referred to herein as monodisperse polymer particles or MPP.

Thus viewed from one aspect the invention provides a method for the treatment of a hydrocarbon well which method comprises administering down said well polymeric particles impregnated with a well treatment chemical or precursor or generator thereof, said particles having a pore volume of at least 20%, preferably at least 30%, and being prepared by a process which comprises preparing in a first step an aqueous dispersion of polymer particles containing from 0.05 to 10 times by volume, based on the polymer, of one or more materials having a water-solubility of $<10^{-2}$ g/l and having a molecular weight of <5000 g/mol (herein referred to as Substance I) said Substance I not being an oligomer of the polymer forming the particles and being non-crystalline at the temperature at which it is incorporated into the particles and is in liquid form at the temperature at which Substance II is introduced in a second step, and in said second step adding a partly water-soluble material (herein referred to as Substance II) having a water-solubility of at least ten times that of Substance I under conditions which prevent or hinder transport of Substance I through the aqueous phase, whereby Substance II diffuses into the polymer particles swelled with Substance I and increases the volume of said particles by from 20 to 1000 times, based on the polymer.

The polymer particles used may be particles prepared by the swell-polymerisation process (i.e. according to EP-B-3905) or may be particles prepared from seed particles produced by such a process and then further enlarged, e.g. as described in WO 99/19375. For further discussions of "Substance I" and "Substance III", the reader is referred to EP-B-3905.

Viewed from a further aspect the invention provides polymeric particles impregnated with a well treatment chemical or precursor or generator thereof, said particles having a pore volume of at least 20%, preferably at least 30%, and being prepared by a process which comprises preparing in a first step an aqueous dispersion of polymer particles containing from 0.05 to 10 times by volume, based on the polymer, of one or more materials having a water-solubility of $<10^{-2}$ g/l and having a molecular weight of <5000 g/mol (herein referred to as Substance I) said Substance I not being an oligomer of the polymer forming the particles and being non-crystalline at the temperature at which it is incorporated into the particles and is in liquid form at the temperature at which Substance II is introduced in a second step, and in said second step adding a partly water-soluble material (herein referred to as Substance II) having a water-solubility of at least ten times that of Substance I under conditions which prevent or hinder transport of Substance I through the aqueous phase, whereby Substance II diffuses into the polymer particles swelled with Substance I and increases the volume of said particles by from 20 to 1000 times, based on the polymer.

Viewed from another aspect the invention provides the use for the manufacture of hydrocarbon well treatment compositions of polymeric particles impregnated with a well treatment chemical or precursor or generator thereof, said particles having a pore volume of at least 20%, preferably at least 30%, and being prepared by a process which comprises preparing in a first step an aqueous dispersion of polymer particles containing from 0.05 to 10 times by volume, based on the polymer, of one or more materials having a water-solubility of <$10^{-2}$ g/l and having a molecular weight of <5000 g/mol (herein referred to as Substance I) said Substance I not being an oligomer of the polymer forming the particles and being non-crystalline at the temperature at which it is incorporated into the particles and is in liquid form at the temperature at which Substance II is introduced in a second step, and in said second step adding a partly water-soluble material (herein referred to as Substance II) having a water-solubility of at least ten times that of Substance I under conditions which prevent or hinder transport of Substance I through the aqueous phase, whereby Substance II diffuses into the polymer particles swelled with Substance I and increases the volume of said particles by from 20 to 1000 times, based on the polymer.

Viewed from a still further aspect the invention comprises a hydrocarbon well treatment composition comprising a carrier liquid containing polymeric particles impregnated with a well treatment chemical or precursor or generator thereof, said particles having a pore volume of at least 20%, preferably at least 30%, and being prepared by a process which comprises preparing in a first step an aqueous dispersion of polymer particles containing from 0.05 to 10 times by volume, based on the polymer, of one or more materials having a water-solubility of <$10^{-2}$ g/l and having a molecular weight of <5000 g/mol (herein referred to as Substance I) said Substance I not being an oligomer of the polymer forming the particles and being non-crystalline at the temperature at which it is incorporated into the particles and is in liquid form at the temperature at which Substance II is introduced in a second step, and in said second step adding a partly water-soluble material (herein referred to as Substance II) having a water-solubility of at least ten times that of Substance I under conditions which prevent or hinder transport of Substance I through the aqueous phase, whereby Substance II diffuses into the polymer particles swelled with Substance I and increases the volume of said particles by from 20 to 1000 times, based on the polymer.

Viewed from a yet further aspect the invention comprises a tubular filter for down-hole placement containing polymeric particles impregnated with a well treatment chemical or precursor or generator thereof, said particles having a pore volume of at least 20%, preferably at least 30%, and being prepared by a process which comprises preparing in a first step an aqueous dispersion of polymer particles containing from 0.05 to 10 times by volume, based on the polymer, of one or more materials having a water-solubility of <$10^{-2}$ g/l and having a molecular weight of <5000 g/mol (herein referred to as Substance I) said Substance I not being an oligomer of the polymer forming the particles and being non-crystalline at the temperature at which it is incorporated into the particles and is in liquid form at the temperature at which Substance II is introduced in a second step, and in said second step adding a partly water-soluble material (herein referred to as Substance II) having a water-solubility of at least ten times that of Substance I under conditions which prevent or hinder transport of Substance I through the aqueous phase, whereby Substance II diffuses into the polymer particles swelled with Substance I and increases the volume of said particles by from 20 to 1000 times, based on the polymer.

In the method of the invention the impregnated polymer particles may be placed down hole before and/or after hydrocarbon production (i.e. extraction of oil or gas from the well) has begun. Preferably the impregnated particles are placed down hole before production has begun, especially in the completion phase of well construction.

The impregnated particles may be placed within the bore hole (e.g. in the hydrocarbon bearing strata or in ratholes) or within the surrounding formation (e.g. in fissures or within the rock itself). In the former case, the particles are conveniently contained within a tubular filter, e.g. a gravel pack or a filter structure as disclosed in EP-A-656459 or WO 96/27070; in the latter case, the impregnated particles are preferably positioned by squeezing a liquid composition containing the particles down the bore hole. Preferably, before production begins the impregnated particles are placed both within the bore in a filter and within the surrounding formation.

Where the impregnated particles are placed within the surrounding formation, the pressure used should be sufficient to cause the particles to penetrate at least 1m, more preferably at least 1.5 m, still more preferably at least 2 m, into the formation. If desired, the impregnated particles may be applied in conjunction with proppant particles (e.g. as described in WO 99/54592) to achieve a penetration of up to about 100 m into the formation. Compositions comprising proppant particles and impregnated polymer particles according to the invention form a further aspect of the invention.

The impregnated particles according to the invention advantageously have mode particle sizes (e.g. as measured with a Coulter particle size analyser) of 1 µm to 5 mm, more preferably 10 µm to 1000 µm, especially 250 to 800 µm. For placement within the formation, the mode particle size is preferably 1 to 50 µm, especially 2 to 20 µm. For any particular formation, formation permeability (which correlates to the pore throat sizes in the formation) may readily be determined using rock samples taken during drilling and the optimum impregnated particle size may thus be determined. Since the "Ugelstad" particles have a very low dispersity (i.e. size variation), a highly uniform deposition and deep penetration into the formation can be achieved. For this reason, the particles preferably have a coefficient of variation (CV) of less than 10%, more preferably less than 5%, still more preferably less than 2%.

CV is determined in percentage as $$CV = 100 \times \frac{\text{standare deviation}}{\text{mean}}$$

where mean is the mean particle diameter and standard deviation is the standard deviation in particle size. CV is preferably calculated on the main mode, i.e. by fitting a monomodal distribution curve to the detected particle size distribution. Thus some particles below or above mode size may be discounted in the calculation which may for example be based on about 90% of total particle number (of detectable particles that is). Such a determination of CV is performable on a Coulter LS 130 particle size analyzer.

For placement in filters, the impregnated particles preferably have mode particle sizes of 50 to 5000 µm, more especially 50 to 1000 µm, still more preferably 100 to 500 µm. In such filters, the impregnated particles preferably constitute 1 to 99% wt, more preferably 2 to 30% wt, still more preferably 5 to 20% wt of the particulate filter matrix, the remaining matrix comprising particulate oil- and water-insoluble inorganic material, preferably an inorganic oxide such as silica, alumina or alumina-silica. Particularly preferably, the inorganic oxide has a mode particle size which is similar to that of the impregnated polymer particles, e.g. within 20%, more preferably within 10%. As with the in-formation placement, the impregnated polymer particles preferably have low dispersity, e.g. a CV of less than 10%, more preferably less than 5%, still more preferably less than 2%. The low dispersity serves to hinder clogging of the filters.

The monodisperse polymer particles preferably have pore size radii of 10 to 30000 Å, more preferably 50 to 10000 Å, especially 100 to 5000 Å. Advantageously particles are used having a range of pore size radii so that materials contained therein have a range of leaching rates.

Unlike the prior art inorganic particulate carriers, capsule carriers and oligomeric carriers for well treatment chemicals, the Ugelstad particles can be made with very high porosity, allowing the particles to be uniformly impregnated with a large quantity of the well treatment chemical which will leach out over a prolonged period and yet leave structurally intact particles. Accordingly, the impregnated particles are preferably particles having a pore volume of at least 25%, more preferably at least 30%, e.g up to 90%.

The particles used according to the invention, eg. MPP or other step-grown polymer particles, are preferably vinyl homo- and copolymers more preferably styrenic homo- and copolymers. Examples of appropriate monomers include vinyl aliphatic monomers such as esters of acrylic and methacrylic acids, acrylonitrile, and vinyl aromatic monomers such as styrene and substituted styrenes. Preferred polymers are styrenic polymers, optionally and preferably cross-linked, e.g. with divinyl benzene, and particles of such polymers are commercially available in a range of sizes and pore volumes from Dyno Specialty Polymers AS of Lillestrøm, Norway. If desired, the particles may be functionalised, e.g. to provide surface acidic or basic groups (e.g. carboxyl or amino functions), for example to scavenge metal atoms from water reaching the particles so as to reduce scale formation, to promote particle adhesion to formation surfaces, to promote or hinder particle aggregation, etc. Again functionalised particles are available from Dyno Specialty Polymers AS.

Preferably the polymer matrix of the impregnated particles has a softening point above the temperatures encduntered down hole, e.g. one above 70° C., more preferably above 100° C., still more preferably above 150° C.

The well treatment chemicals or precursors or generators thereof with which the MPP are impregnated may be any agents capable of tackling down hole problems, such as corrosion, hydrocarbon flow reduction, or $H_2S$ generation. Examples of such agents include scale inhibitors, foamers, corrosion inhibitors, biocides, surfactants, oxygen scavengers, bacteria etc.

The material with which the MPP are impregnated may be a well treatment chemical itself or a precursor chemical compound which in situ will react, e.g. break down, to produce a well treatment chemical, or alternatively it may be a biological agent, e.g. an enzyme or bacterium which produces a well treatment chemical which exerts its effect within or outside the bacterial cells.

In general, the well treatment chemicals will be oil-insoluble and water-soluble chemicals which leach out of the impregnated particles when water begins to reach the bore hole or the area of the formation in which the particles are placed. Where the particles are impregnated with well treatment chemical generating bacteria, these are preferably thermophilic bacteria which in the absence of water are in a dormant phase, and especially preferably they are ultra microbacteria or nanobacteria. Generally where the particles are impregnated with bacteria, they will also be impregnated with nutrients for the bacteria, e.g. sucrose, so that bacterial growth is promoted once the particles encounter water.

Example of typical well treatment chemicals, precursors and generators are mentioned in the patent publications mentioned herein, the contents of all of which are hereby incorporated by reference.

Thus for example typical scale inhibitors include inorganic and organic phosphonates (e.g. sodium aminotrismethylenephosphonate), polyaminocarboxylic acids, polyacrylamines, polycarboxylic acids, polysulphonic acids, phosphate esters, inorganic phosphates, polyacrylic acids, insulins (e.g. sodium carboxymethyl insulin), phytic acid and derivatives (especially carboxylic derivatives) thereof, polyaspartates, etc.

The use of environmentally friendly scale inhibitors, e.g. insulins, phytic acid and derivatives thereof and polyaspartates, is especially preferred. It is also novel and the use of such chemicals as down-hole scale inhibitors forms a further aspect of the present invention.

Where the scale inhibitor is a polymer it may of course contain residues of one or more different comonomers.

Examples of preferred well treatment chemicals include: hydrate inhibitors, scale inhibitors, asphaltene inhibitors, wax inhibitors and corrosion inhibitors. Such inhibitors are well known to those working in the field of well treatment.

Where the impregnated particles are placed within the formation, they are preferably applied as a dispersion in a liquid carrier. For pre- and post-completion application, the liquid carrier preferably comprises a non-aqueous organic liquid, e.g. a hydrocarbon or hydrocarbon mixture, typically a $C_3$ to $C_{15}$ hydrocarbon, or oil, e.g. crude oil. For curative treatment, i.e. after production has continued for some time, the liquid carrier may be aqueous or non-aqueous.

Impregnation of the well treatment chemical, precursor or generator into the MPP may be effected by any conventional manner, e.g. by contacting the particles with an aqueous or non-aqueous solution or dispersion of the chemical, precursor or generator followed if necessary by solvent removal, e.g. by draining, drying or under vacuum.

However it is especially preferred to impregnate the particles by slurry mixing, i.e. by adding a quantity of solution which is close to the pore volume of the particles, e.g. 0.8 to 1.2 times pore volume more preferably 0.9 to 1.1 times pore volume. Still more preferred is to impregnate the particles by spraying a solution onto a fluidized bed of the particles, for example a gas flow fluidized bed or more preferably a mechanically fluidized bed, e.g. one fluidized using a Forberg mixer. If desired particle loading may be increased by carrying out more than one impregnation step.

The invention will now be described further with reference to the following non-limiting Examples:

EXAMPLE 1

Beads Impregnated with Insulin 5 g of styrene:divinyl benzene polymer particles (pore volume 40%, 100 µm particle diameter, available from Dyno Speciality Polymers AS, Lillestrøm, Norway) were placed in a 250 mL round flask for a rotovapor. The flask was evacuated to a pressure of 2 mbar with moderate rotation. After 10 minutes, a mixture of 25 g of a 10% wt aqueous solution of sodium carboxymethyl insulin (Carbocyline CM 10PP from Cosun Industrial Insulin Derivatives, Netherlands) and 25 mL methanol was added. The flask was rotated for one hour at ambient temperature under reduced pressure.

The flask was removed from the rotator, 60 mL of n-butyl acetate was added and the flask was placed in a warming blanket.

The flask was mounted with a water-separator with a water cooler and heated to reflux (about 90° C.), removing about 25 mL of water. The particles were then filtered and dried under vacuum at 40° C.

EXAMPLE 2

Beads Impregnated with Insulin 3 g of styrene:divinyl benzene polymer particles (as used for Example 1) were dispersed in a mixture of 15 g of a 10% wt aqueous solution of sodium carboxymethyl insulin and 15 mL of methanol in a 250 mL round flask. The flask was evacuated to 2 mbar and heated to 50° C. and rotated at moderate speed until the particles were dry.

EXAMPLE 3

Beads Impregnated with Pentaphosphonate 3 g of 112 μm porous polymer particles (T-12—available from Dyno Speciality Polymers AS) were dispersed in 12 g of an aqueous pentaphosphonate solution (Champion SA 1130) in a 250 mL round flask for a rotavapor. Sodium hydrogen carbonate was then added so as to form the sodium salt of the pentaphosphonate. Addition continued until carbon dioxide generation ceased. The pH of the mixture was then determined to be about 7.

The flask was evacuated to 5 to 10 mbar on a rotovapor and then rotated slowly at ambient temperature for 30 minutes. The evacuation removed any remaining carbon dioxide. The flask was then rotated at 40° C. until all the water was distilled off. 9.6 g of dry crude product was obtained. 3 g was removed and the remainder was rinsed with 50 mL water which was then separated off by filtration. The rinsed particles were then dried at 40-50° C. yielding 2.19 g of dried impregnated particles.

EXAMPLE 4

Beads Impregnated with Insulin 3 g of 112 μm porous polymer particles (T-12—available from Dyno Speciality Polymers AS) and 13.5 g insulin were placed in a 250 mL round flask for a rotavapor and 25 mL of water was added.

The flask was evacuated to 5 to 10 mbar on a rotovapor and then rotated slowly at ambient temperatures for 30 minutes. It was then rotated at 40° C. until all the water had been distilled off. 8.5 g of dry crude product was obtained. 3 g was removed, and the remainder was rinsed by addition of water (25 mL) which was then removed by filtration whereafter the particles were dried at 40-50° C. 1.75 g of insulin loaded particles were obtained after this drying.

The invention claimed is:

1. A method for the treatment of a hydrocarbon well, which method comprises administering, down said well, polymeric particles impregnated with a well treatment chemical or precursor or generator thereof, wherein said particles have a pore volume of at least 20%, and are prepared by a process which comprises:

(A) preparing an aqueous dispersion of polymer particles containing from 0.05 to 10 times by volume, based on the polymer, of one or more first material(s) having a water-solubility of $<10^{-2}$ g/l and having a molecular weight of <5000 g/mol, said first material(s) not being an oligomer of the polymer forming the particles and being non-crystalline at the temperature at which it is incorporated into the particles and is in liquid form at the temperature at which a partly water-soluble material is introduced in step (B); and (B) adding a partly water soluble second material, having a water-solubility of at least ten times that of said first material(s), under conditions which prevent or hinder transport of said first material(s) through the aqueous phase, whereby said second material diffuses into the polymer particles swelled with said first material(s) and increases the volume of said particles by from 20 to 1000 times, based on the polymer.

2. The method as claimed in claim 1, wherein said polymeric particles are administered down said well before hydrocarbon production from said well begins.

3. The method as claimed in claims 1 or 2, wherein said polymeric particles are placed in a filter in the bore-hole of said well and within the formation surrounding said bore-hole.

4. The method as claimed in claim 1, wherein said well treatment chemical or precursor or generator thereof is selected from the group consisting of a scale inhibitor, corrosion inhibitor, wax inhibitor, asphaltene inhibitor, foamer, biocide, surfactant, oxygen scavenger and bacteria.

5. Polymeric particles impregnated with a well treatment chemical or precursor or generator thereof, wherein said particles are prepared by a process which comprises:

(A) preparing an aqueous dispersion of polymer particles containing from 0.05 to 10 times by volume, based on the polymer, of one or more first material(s) having a water-solubility of $<10^{-2}$ g/l and having a molecular weight of <5000 g/mol, said first material(s) not being an oligomer of the polymer forming the particles and being non-crystalline at the temperature at which it is incorporated into the particles and is in liquid form at the temperature at which a partly water-soluble material is introduced in step (B);

(B) adding to said aqueous dispersion obtained in step (A), a partly water soluble second material, having a water-solubility of at least ten times that of said first material(s), under conditions which prevent or hinder transport of said first material(s) through the aqueous phase, whereby said second material diffuses into the polymer particles swelled with said first material(s) and increases the volume of said particles by from 20 to 1000 times, based on the polymer; and (C) contacting said particles obtained in step (B) with an aqueous or non-aqueous solution or dispersion of said chemical, precursor or generator thereof, and said particles have a pore volume of at least 20%, wherein said well treatment chemical or precursor or generator thereof is a scale inhibitor selected from the group consisting of an insulin, phytic acid, phytic acid derivative and polyaspartate.

6. A hydrocarbon well treatment composition comprising a carrier liquid containing polymeric particles impregnated with a well treatment chemical or precursor or generator thereof, wherein said particles have a pore volume of at least 20%, and are prepared by a process which comprises:

(A) preparing an aqueous dispersion of polymer particles containing from 0.05 to 10 times by volume, based on the polymer, of one or more first material(s) having a water-solubility of $<10^{-2}$ g/l and having a molecular weight of <5000 g/mol, said first material(s) not being an oligomer of the polymer forming the particles and being non-crystalline at the temperature at which it is incorporated into the particles and is in liquid form at the temperature at which a partly water-soluble material is introduced in step (B);

(B) adding to said aqueous dispersion obtained in step (A), a partly water soluble second material, having a water-solubility of at least ten times that of said first material(s), under conditions which prevent or hinder transport of said first material(s) through the aqueous phase, whereby said second material diffuses into the polymer particles swelled with said first material(s) and increases the volume of said particles by from 20 to 1000 times, based on the polymer; and (C) contacting said particles obtained in step (B) with an aqueous or non-aqueous solution or dispersion of said chemical, precursor or generator thereof, wherein said well treatment chemical or precursor or generator thereof is a scale inhibitor selected from the group consisting of an insulin, phytic acid, phytic acid derivative and polyaspartate.

7. A tubular filter for down-hole placement containing polymeric particles impregnated with a well treatment chemical or precursor or generator thereof, wherein said particles have a pore volume of at least 20%, and are prepared by a process which comprises:

(A) preparing an aqueous dispersion of polymer particles containing from 0.05 to 10 times by volume, based on the polymer, of one or more first material(s) having a water-solubility of $<10^{-2}$ g/l and having a molecular weight of <5000 g/mol, said first material(s) not being an oligomer of the polymer forming the particles and being non-crystalline at the temperature at which it is incorporated into the particles and is in liquid form at the temperature at which a partly water-soluble material is introduced in step (B); and (B) adding to said aqueous dispersion obtained in step (A), a partly water soluble second material, having a water-solubility of at least ten times that of said first material(s), under conditions which prevent or hinder transport of said first material(s) through the aqueous phase, whereby said second material diffuses into the polymer particles swelled with said first material(s) and increases the volume of said particles by from 20 to 1000 times, based on the polymer.

8. The filter as claimed in claim 7, wherein said filter comprises a particulate filter matrix of which said polymeric particles constitute 2 to 30% wt.

9. The filter as claimed in claim 7 or 8, wherein said well treatment chemical or precursor or generator thereof is selected from the group consisting of a scale inhibitor, corrosion inhibitor, wax inhibitor, asphaltene inhibitor, foamer, biocide, surfactant, oxygen scavenger and bacteria.

10. The method as claimed in claim 4, wherein said particles are impregnated with a scale inhibitor selected from the group consisting of insulin, phytic acid, phytic acid derivative and polyaspartate.

* * * * *